W. H. AKENS.
HARVESTER-DROPPER.

No. 183,275.  Patented Oct. 17, 1876.

WITNESSES:
Chas. Nida.
John Goethals

INVENTOR:
W. H. Akens
BY
ATTORNEYS.

UNITED STATES PATENT OFFICE.

WILLIAM H. AKENS, OF PENNLINE, PENNSYLVANIA.

IMPROVEMENT IN HARVESTER-DROPPERS.

Specification forming part of Letters Patent No. 183,275, dated October 17, 1876; application filed April 4, 1876.

*To all whom it may concern:*

Figure 1:
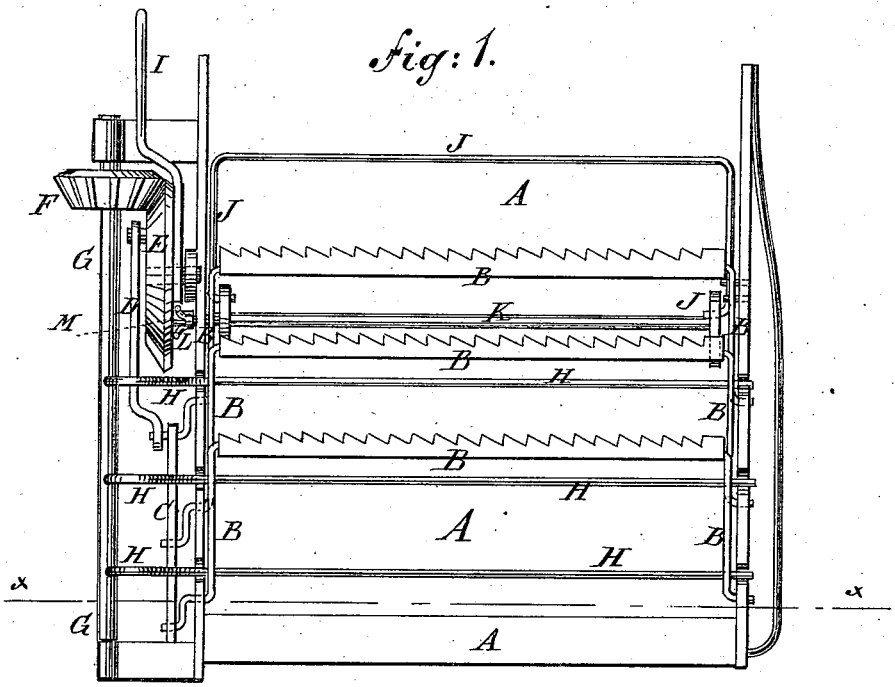
Figure 2:
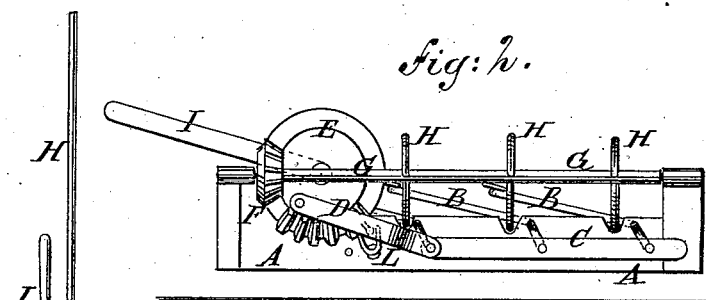
Figure 3:
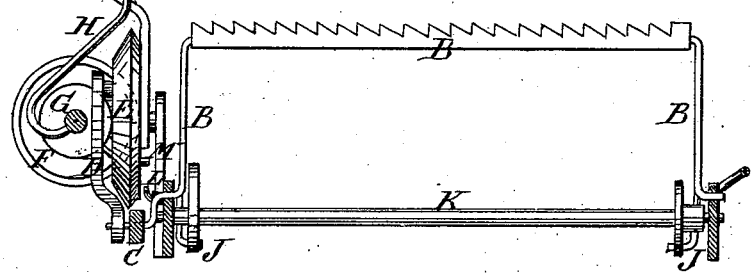

Be it known that I, WILLIAM H. AKENS, of Pennline, in the county of Crawford and State Pennsylvania, have invented a new and useful Improvement in Side Deliverer for Reapers, of which the following is a specification:

Figure 1 is a top view of my improved device, shown as applied to a reaper-platform. Fig. 2 is a side view of the same. Fig. 3 is a rear view of the same, partly in section, through the line *x x*, Fig. 1.

Similar letters of reference indicate corresponding parts.

The object of this invention is to furnish an improved device for delivering the cut grain from the platform of a reaper, and in neat gavels at the side of the reaper, and out of its way in making the next round, and which shall be simple in construction and convenient in use.

The invention consists in the combination of the bails, the fingers or rake, and the guard-bail, and the connecting-bars, gear-wheels, lever, shaft, fork, and pin, by which said bails, fingers, and guard-bail are operated with each other and the platform of a reaper, as hereinafter fully described.

A represents the platform of a reaper, to the side guards of which are pivoted the ends of three or more bails, B, the horizontal parts of which are provided with teeth to cause them to carry the cut grain with them. The inner ends of the bails B have small cranks formed upon them, the crank-pins of which are pivoted to a connecting-bar, C, so that they may always move together. To the forward end of the connecting-bar C is pivoted the rear end of a pitman, D, the forward end of which is pivoted to a crank-pin attached to the segmental gear-wheel E, the teeth of which mesh into the teeth of a bevel-gear wheel, F, attached to a shaft, G. The shaft G revolves in bearings attached to the frame of the reaper, and to it are attached the ends of three or more fingers, H, which form the rake, and which are bent, as shown in Figs. 1, 2, and 3, so as to pass into the notches in the side guards of the platform A beneath the arms of the bails B. To the segmental gear-wheel E is attached a lever, I, to enable the driver to turn it to bring its teeth into gear with the teeth of wheel F. J is a bail, the arms of which are attached to a shaft, K, or to small wheels attached to said shaft. The shaft K revolves in bearings in the side guards of the platform A, and to its inner end is attached a fork, L, to be struck by a pin, M, attached to the segmental gear-wheel E.

With this construction, when enough grain for a gavel has fallen upon the platform, the lever I is operated to turn the segmental gear-wheel E. This raises the bails B and carries the cut grain to the rearward. As the bails B come into an erect position, the teeth of the wheel E mesh into the teeth of the wheel F, and turn it, which turns the shaft G and raises the fingers H, raising the gavel from the bails B, and allowing it to slide from the fingers H to the ground at the side of the machine, and out of its way in the next round. As the bails B are beginning to rise, the pin M strikes the fork L and raises the bail J to receive the cut grain and support it until the gavel has been discharged and the fingers H and bails B have been again lowered into place.

Having thus described my invention, I claim as new and desire to secure by Letters Patent—

The combination of the bails B, the fingers H, and the guard-bail J, with the connecting-bars C D, gear-wheels E F, lever I, shaft K, fork L, and pin M, by which said bails, fingers, and guard-bail are operated in connection with each other and the platform of a reaper, substantially as herein shown and described.

WILLIAM H. AKENS.

Witnesses:
J. D. BOWMAN,
A. J. SMITH.